United States Patent [19]

Crossland et al.

[11] Patent Number: 4,720,781
[45] Date of Patent: Jan. 19, 1988

[54] DATA PROCESSING TERMINAL HAVING SUPPORT MODULE AND PORTABLE DISPLAY MODULE FOR LIQUID CRYSTAL DISPLAY

[75] Inventors: William A. Crossland, Harlow; Jack R. Peters, Great Cranfield, Near Dunmow; Harry J. Smith, Sawbridgeworth, all of England; Frank Astorino, Essex Fells, N.J.

[73] Assignee: STC PLC, London, England

[21] Appl. No.: 672,008

[22] Filed: Nov. 16, 1984

[30] Foreign Application Priority Data

Nov. 30, 1983 [GB] United Kingdom ............... 8331951

[51] Int. Cl.$^4$ .............................................. G06F 3/033
[52] U.S. Cl. .................................. 364/200; 340/825.35
[58] Field of Search ... 364/200 MS File, 900 MS File, 364/518, 521; 340/720, 798, 799, 825.35, 717

[56] References Cited

U.S. PATENT DOCUMENTS

| 4,107,784 | 8/1978 | Van Bemmelen | 364/900 |
|---|---|---|---|
| 4,267,555 | 5/1981 | Boyd | 340/720 |
| 4,277,837 | 7/1981 | Stuckert | 340/825.35 |
| 4,454,414 | 6/1984 | Benton | 340/825.35 |
| 4,523,087 | 7/1985 | Benton | 235/379 |
| 4,530,069 | 7/1985 | Desrochers | 364/900 |

FOREIGN PATENT DOCUMENTS

| 2064193 | 6/1981 | United Kingdom . |
| 2067811 | 7/1981 | United Kingdom . |
| 2067812 | 7/1981 | United Kingdom . |
| 2075737 | 11/1981 | United Kingdom . |
| 2120396 | 11/1983 | United Kingdom . |

OTHER PUBLICATIONS

"Flat Matrix Addressed Smectic Liquid Crystal Display" M. Hareng et al. at pp. 106–107 in the Digest of Technical Papers of the 1981 International Symposium (NY, U.S.A.) of the Society of Information Display.

Primary Examiner—Raulfe B. Zache
Assistant Examiner—Emily Y. Chan
Attorney, Agent, or Firm—Lee, Smith & Zickert

[57] ABSTRACT

The data processing terminal comprises a smectic liquid crystal flat panel display module (2) which is supported by a support module (1). The terminal also includes a keyboard (4). The display module (2) may be removed from the support module (1) and has its own central processor, memory, control means and power source to enable it to operate independently of the support module, which contains its own central processor, memory, control means, and interface means and is mains operated. The display module may incorporate a touch sensitive overlay to permit the manipulation of the contents of the display. The support unit may incorporate a telephone interface unit.

11 Claims, 7 Drawing Figures

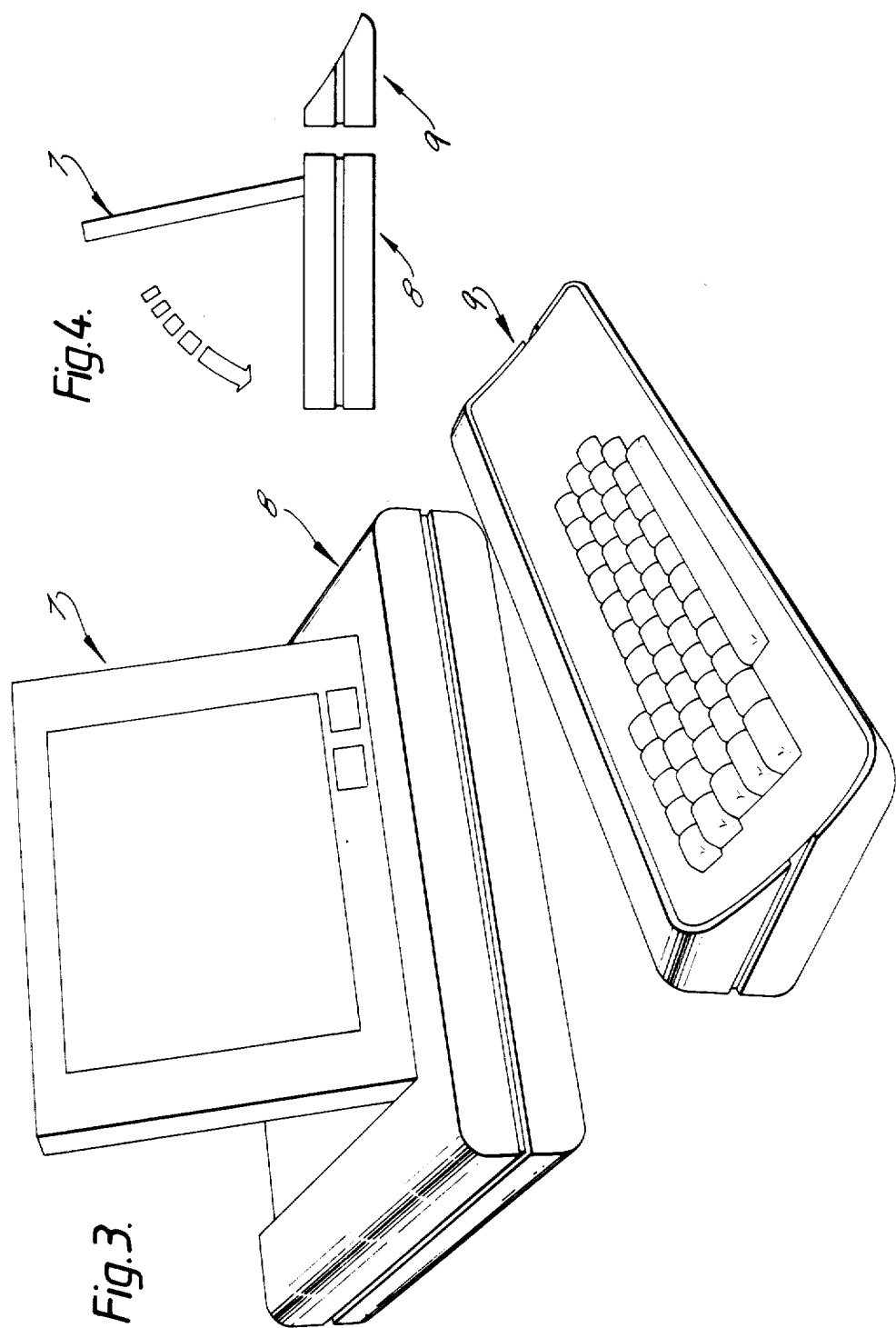

DATA PROCESSING TERMINAL HAVING SUPPORT MODULE AND PORTABLE DISPLAY MODULE FOR LIQUID CRYSTAL DISPLAY

BACKGROUND OF THE INVENTION

The present invention relates to data processing terminals and is directed more particularly to data processing terminals that include smectic liquid crystal flat panel visual displays.

Prior to the present invention the displays used in office data processing terminals have included cathode ray tube type displays which have various disadvantages including size and lack of tolerance to high levels of ambient lighting.

SUMMARY OF THE INVENTION

In accordance with the present invention there is provided an office data processing terminal that incorporates a visual display unit the includes a smectic liquid crystal flat panel display.

DESCRIPTION OF THE DRAWINGS

The present invention will now be described with reference to the accompanying drawings, in which:

FIG. 3 is a simplified perspective view of a terminal that includes a support module having a rotatable display and a keyboard;

FIG. 4 is a side view of the terminal of FIG. 3 and illustrates the rotation of the rotatable display thereof;

DESCRIPTION OF THE PREFERRED EMBODIMENTS

The present invention is based on the recognition that the replacement of a cathode ray tube display by a flat panel display offers various advantages in terms of size, shape and aesthetic appeal, and that a smectic liquid crystal flat panel display, in particular, will overcome various other disadvantages of cathode ray tube displays by providing a flicker-free display that can be ambiently lit at a wide range of ambient lighting levels.

Many office terminal configurations employing flat panel displays are possible and those illustrated in FIGS. 1 and 2 and FIGS. 3 and 4, respectively, are included by way of example only. The embodiment of FIGS. 1 and 2, for example, includes two flat panel display panels, while that of FIGS. 3 and 4 includes only a single display panel.

Figure 1:
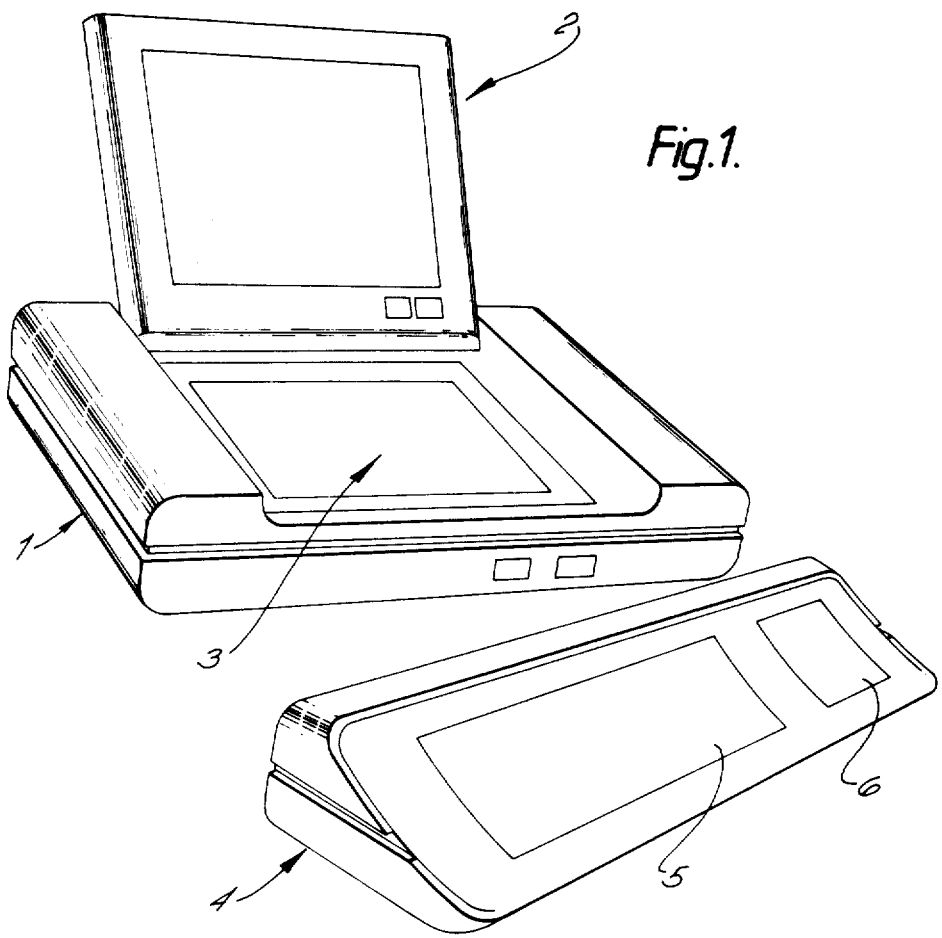
FIG. 1 is a simplified perspective view of a terminal that includes a fixed display, a rotatable display, and a keyboard.
Figure 2:
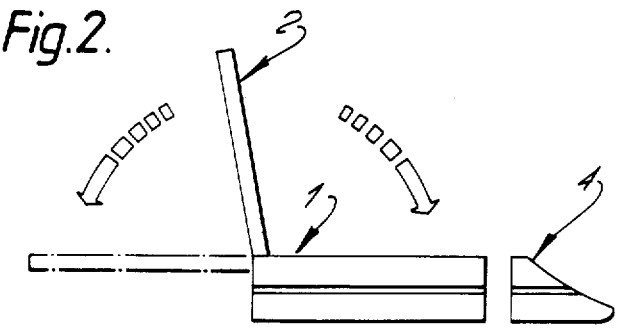
FIG. 2 is a side view of the terminal of FIG. 1 and illustrates the rotation of the rotatable display thereof.
Figure 5:
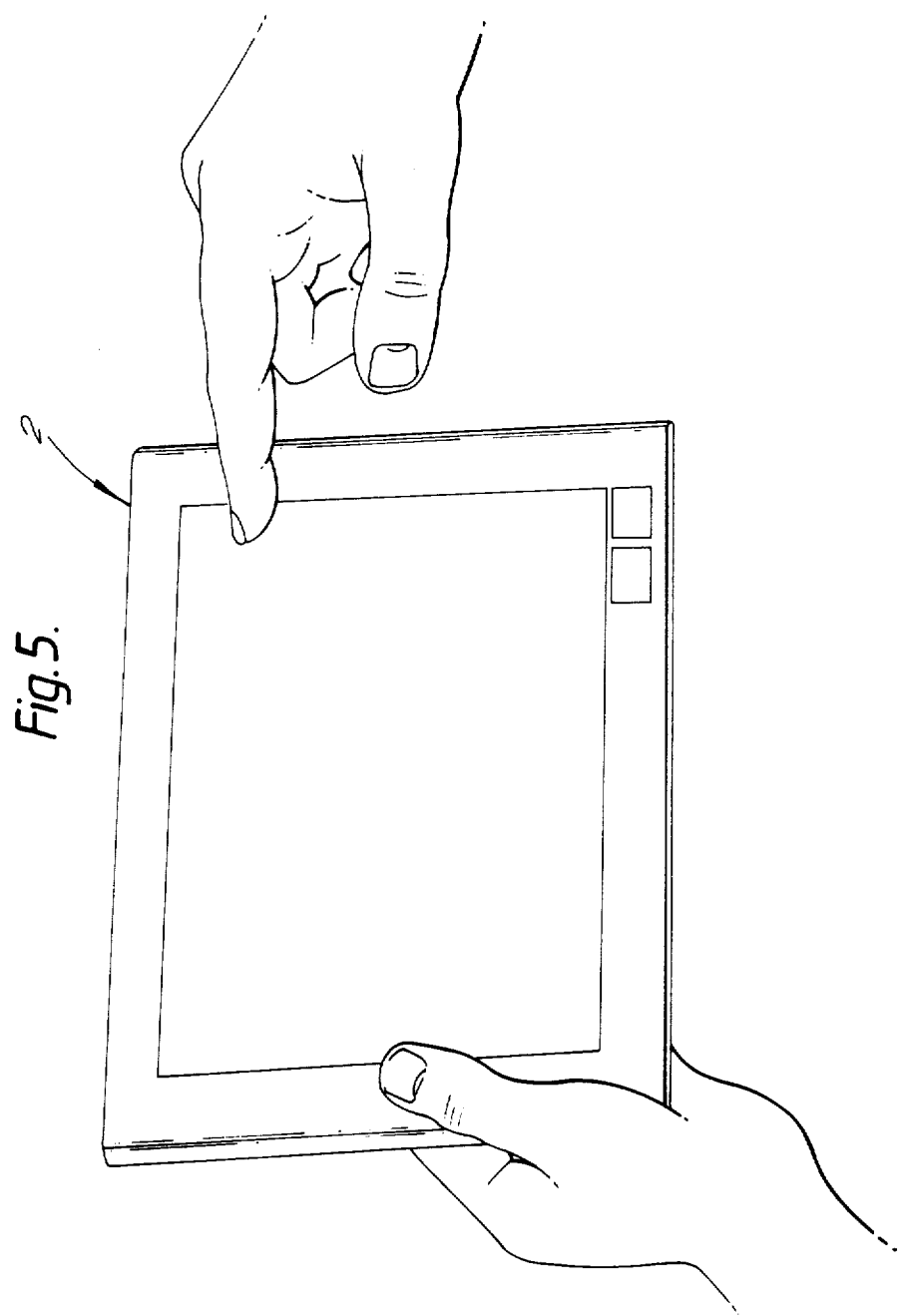
FIG. 5 illustrates the use of a display module which is adapted to operate independently of the support module therefor.

Referring firstly to FIGS. 1 and 2, the office terminal illustrated therein includes a support module 1, a first flat panel display module 2, a second flat panel display 3 and a keyboard 4. The display 3 is permanently attached to support module 1 while the display module 2 is shown as pivotally or rotatably attached to support module 1 by a suitable hinge (not shown) so that it may be closed down onto the display 3 or tilted back into any required viewing position, including the fully tilted back position shown in FIG. 2. The display module 2 may also be removed from the support module 1 and used independently thereof, as will be apparent in more detail from the following description and from FIG. 5, when internal batteries will provide the necessary operating power. Alternatively, when the display module and support module are connected together by a suitable cable, the user may position the display module in any position more convenient for his purposes than on the support module. The two display panels 2 and 3 of the embodiment of FIGS. 1 and 2 permit the display of two pages of information at once, thus facilitating comparison thereof. Flat panel displays lend themselves more readily to multiplex embodiments than do cathode ray tube displays, because of their thinness.

The keyboard 4 may be of a conventional type having alphanumeric and function keys (not shown) which may be contained within areas 5 and 6 thereof. A conventional executive office terminal combines a telephone keyboard and a CRT display as one unit and the flat panel terminals of the present invention may, if required, also include a full facility telephone unit. The telephone facilities need not interact directly with the display or the rest of the terminal. The keyboard 4 may have a cord or cordless interface with the support module 1 and, if telephone facilities are included, there may be a cord or cordless telephone handset (not shown) or a "hands-free" microphone/receiver arrangement (not shown). The telephone unit may be incorporated in the support module.

FIGS. 3 and 4 illustrate an embodiment of the invention which includes a single flat panel display module 7 which is pivotally mounted to support module 8 at the front (in use) thereof in order to adopt a position most convenient for the operator as well as to be laid flat into a recess in the top of the support module when not is use. A keyboard 9 has alphanumeric and other function keys, and as described with respect to the keyboard of FIGS. 1 and 2 may have a cord or cordless interface with the support module, the latter enabling the display module to be mounted on the support module and the keyboard to be located anywhere convenient to the terminal operator.

The display module (2-FIG. 1, 7-FIG. 3) may be interfaced with its support module (1-FIG. 1, 8-FIG. 3) in various ways. For example, the display module may be plugged directly into the support module using a standard plug and socket combination, together with a suitable keying and locking arrangement, or the display module may be electrically connected to the support module by a flexible cable having a plug at one end and a socket at the other. The cable plug may fit a socket at the support module and the cable socket may fit the display, or vice versa. The use of a cable would, as mentioned before, enable the display module to be operated with the support module's facilities available to it, but would allow the user freedom to position the display conveniently.

Each display of the terminals is comprised of a large area smectic liquid crystal display, for example, with a 184 mm × 238 mm display area and 24 lines of 80 characters. The display preferably has alphanumeric, graphic and picture forming capability using the electro-optical characteristics of the smectic material, including its unpowered memory characteristic. Such displays can display information with a high contrast, bright information on a black background or black information on a white background, approaching that of print on paper. Power is required for writing or erasing such a display, but once written the display is unpowered, permanent and flicker free.

It is proposed that the office terminals of the present invention be employed to perform many of the functional activities carried out within a normal office environment, and that the display should replace some if not all of the working papers, reports, filing systems, notepads and diaries generally found on an office worker's desk top. Each display may be provided with control means such as a touch sensitive overlay to provide a means of locating required information, such as menu, mail, address, etc. by pointing to and touching a data area on the display to initiate a command. The terminal employs system operating protocols to ensure that the locating of information is achieved in a logical manner. The office terminals will thus allow existing work practices to be followed but with greatly increased efficiency and flexibility. The facilities included in the terminal may include some or all of the following, namely; receiving filed documents; electronic mail; scheduling (diary planning, calendar); form completion; text review and limited editing; local processing (calculation, charts); business graphics; transactions.

The main modules, that is the display module and the support module, will now be described in greater detail. The flat panel display module basically contains display drive circuitry, a local memory for a multiple page storage, supporting intelligence (processing) and a battery for independent operation. The display module is capable of operating independently allowing the user to scan and view the documents stored in its memory. In order to permit simple commands to be entered into the display module control means such as the touch sensitive overlay mentioned above is provided. This touch sensitive input can have two modes of operation, one a supporting role to the keyboard, the other as a main entry device when no keyboard is available. The overlay may be configured as a numeric key pad for compiling data or carrying out calculations when operating in the remote (independent) mode.

The support module is the facility support unit (processing and storage) and power supply for the overall terminal. It supports a range of application programs and interfaces, which programs enable the terminal to carry out many function of the office workstation. It also contains an interface for the keyboard (cordless or otherwise) and support for communications protocols in order to link the terminal to a remote data base or computing facility.

Preferably the terminal goes into a "sleep" state to save power when not being used and is only "woken up" when required to change the displayed information or receive data from an entry device.

Figure 6:
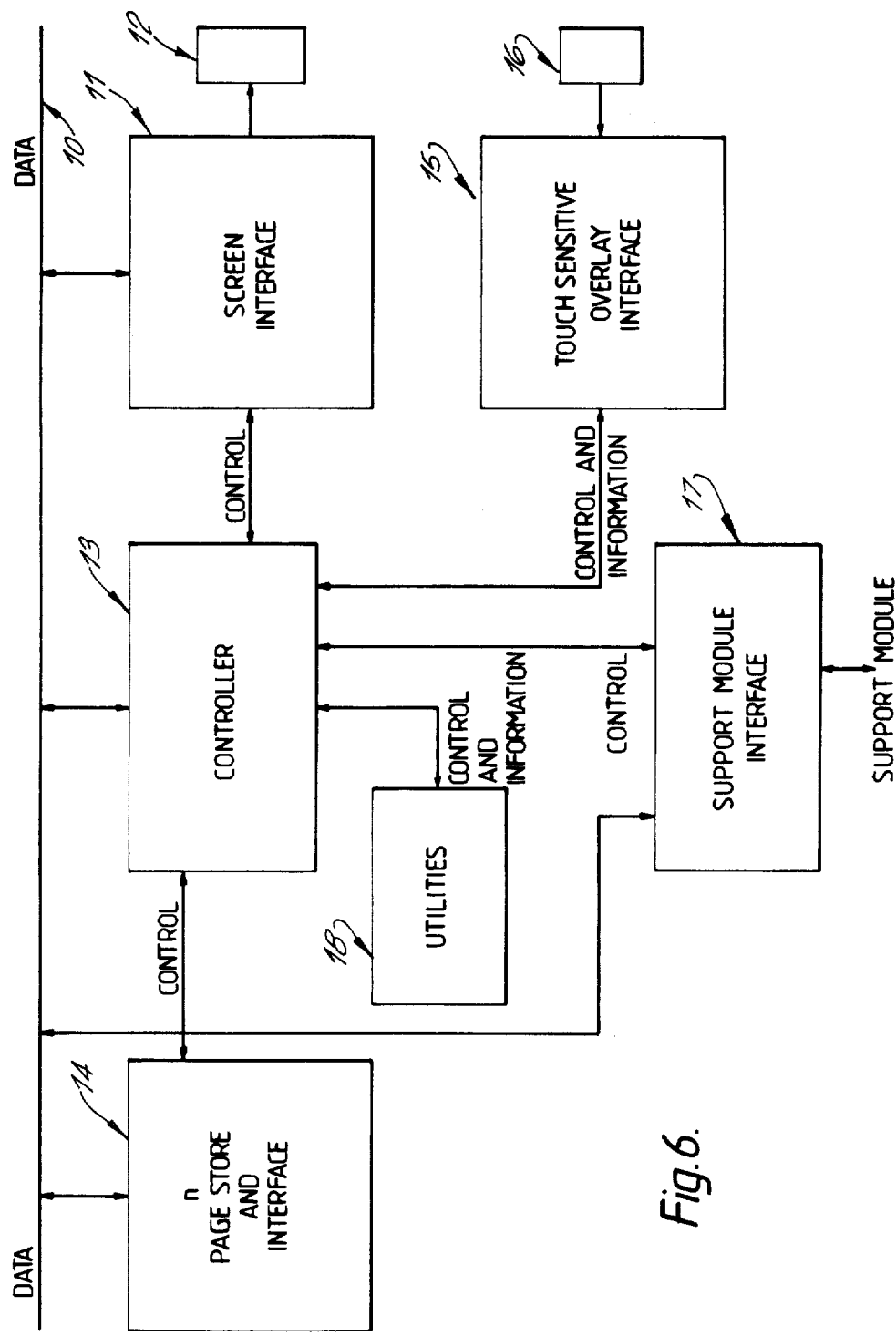
FIG. 6 is a functional block diagram of the circuitry of a display module.

A functional block diagram of a display module is shown in FIG. 6. It comprises a data input line or bus 10, a display screen interface 11, for a flat panel smectic liquid crystal display 12, under the control of a controller or central processor 13, an n-page (for example 20 page) memory and interface 14, a touch sensitive overlay interface 15 for a touch sensitive overlay 16, a support module interface 17 and utilities (application levels) 18 such as data input and page search. The display module has a limited range of functions when operating independently of the support module, which functions include the scanning and display of stored information, with data entry from the touch sensitive overlay or, for example, a bar code wand (not shown) connected to the data input which module can then be used in a data gathering application, for example, stock checking in a store or warehouse.

Figure 7:
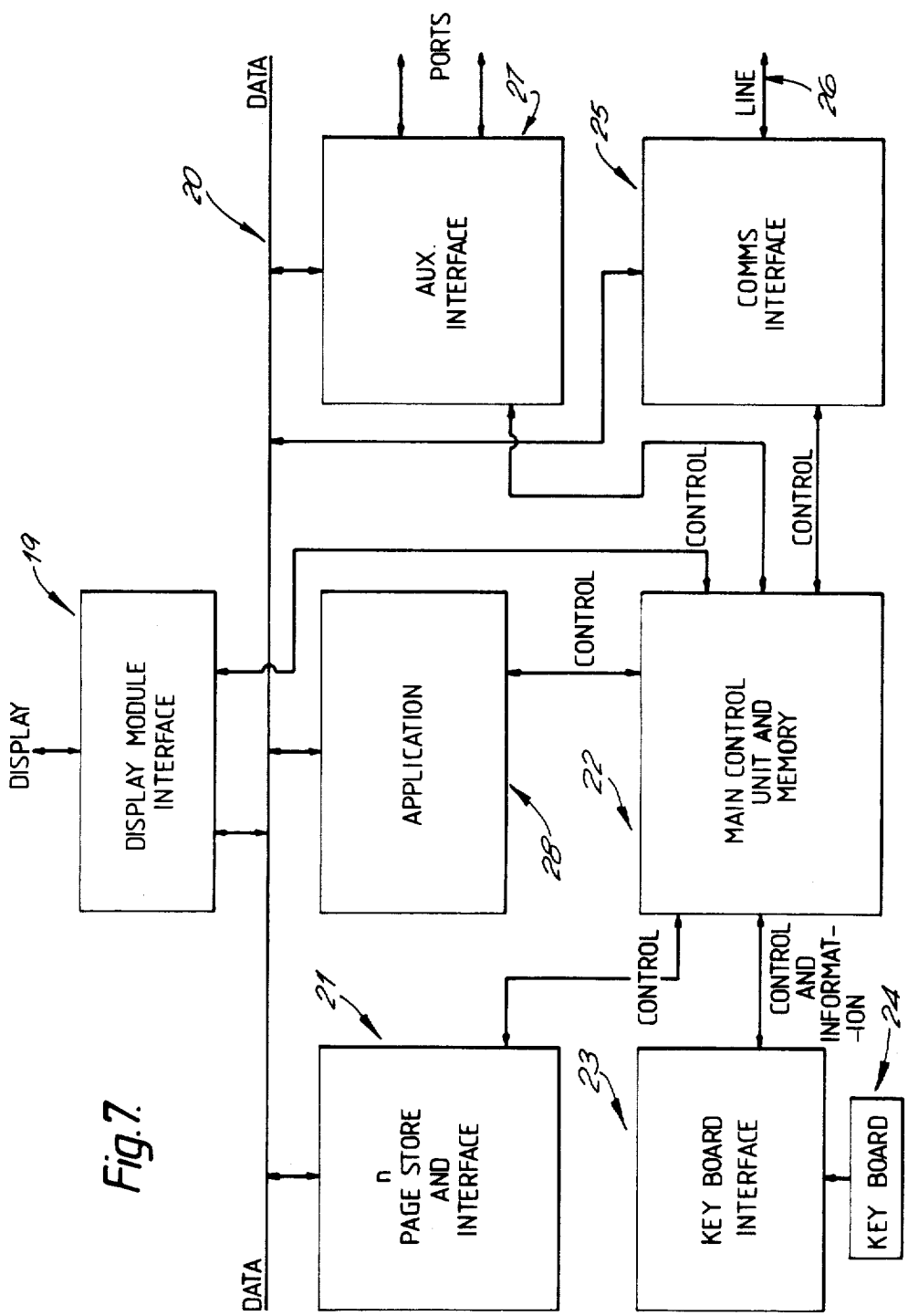
FIG. 7 is a functional block diagram of the circuitry of a support module.

A functional block diagram of a support module is shown in FIG. 7. It comprises a display module interface 19, a connection 20 for a database processor and computer, an n-page memory and interface 21, a main control unit (or central processor) and memory 22, a keyboard interface 23 for a keyboard 24, a communications interface 25 for a line 26, auxiliary interface 27 with a number of parts for, for example, a printer or disk, an application function 28 and an operating system (not shown). The support module software may employ an existing operating system, for example, MIRTOS, and includes facilities for executing programs concurrently sharing resources and information control. The real-time operating system contains memory management, flexible file and device handling, with fast response to interrupts and should have debudding facilities. The user/application software is closely linked to the operating system.

The drive circuitry of the display module comprises display drivers which enable information to be written on the display and may be organized in matrix form. The touch sensitive overlay may comprise a transparent plastic film overlay supporting a conductor array for capacitive touch sensitive operation. Preferably the display module employs CMOS technology which reduces the power requirements to a minimum. Preferably the controllers in the display module and the support module comprise microprocessors. The n-page memories in the display and support modules may comprise semiconductor RAM. In microrocessor programs may be in ROM. The display module battery is preferably rechargeable from the support module. Voltage conversion means will be included in the display module in order to transform the battery output voltage to the voltage necessary to power the smectic display matrix drivers. The support module is AC line powered and contains the power supplies necessary to supply its own circuits and those of the display module when the latter is attached. Preferably manipulation of the display content is largely affected via the touch sensitive overlay, whether in isolation or attached to the support module.

What is claimed is:

1. A data processing terminal incorporating a visual display unit (VDU), comprising:
   (a) a support module, including:
      (i) a first central processor,
      (ii) a first memory connected to the first central processor for storing application programs for execution by said terminal,
      (iii) first control means for communicating commands to the first central processor, and
      (iv) an AC power supply for supplying operating power to the support module;
   (b) a portable display module, for use independently of the support module, including:
      (i) a second central processor,
      (ii) second control means for communicating command to the second central processor,
      (iii) a smectic liquid crystal flat panel display, comprising said visual display unit, having a plurality of electrically actuated picture elements, which flat panel display is for displaying a whole page of data at a time as a result of actuation of the corresponding picture elements, (iv) a touch sensitive overlay disposed over the flat panel display and connected to the second central processor for use in manipulating the contents of the display and for entering data when the display module is not attached to the support module, (v) a second memory connected to the second central processor for storing a number of said pages of data for presentation on said display, (vi) display interface means for controlling the actuation of said picture elements and thus the display of said data, (vii) a battery for supplying operating power to the display module; and (c) means for detachably connecting the display module to the support module to allow the first central processor to control the contents of the display when the display module is connected to the support module.

2. A data processing terminal incorporating a visual display unit (VDU), comprising:

(a) a support module, including:
 (i) a first central processor,
 (ii) a first memory connected to the first central processor for storing application programs for execution by said terminal,
 (iii) first control means for communicating commands to the first central processor, and
 (iv) an AC power supply for supplying operating power to the support module;

(b) a portable display module, for use independently of the support module and in the form of a flat panel element, including:
 (i) a second central processor,
 (ii) second control means for communicating commands to the second central processor,
 (iii) a smectic liquid crystal flat panel display, comorising said visual display unit, the liquid crystal display occupying a major face of said flat panel element and having a plurality of electrically actuated picture elements, which flat panel display is capable of displaying a whole page of data at a time as a result of actuation of the corresponding picture elements,
 (iv) a second memory connected to the second central processor for storing a number of said pages of data for presentation on said display,
 (v) display interface means connected to the display for controlling the actuation of said picture elements and thus the display of said data,
 (vi) a battery for supplying operating power to the display module; and (c) means for detachably connecting the display module to the support module to allow the first central processor to control the contents of the display when the display module is connected to the support module.

3. A data processing terminal incorporating a visual display unit (VDU), comprising:

(a) a support module, including:
 (i) a first central processor,
 (ii) a first memory connected to the first central processor for storing application programs for execution by said terminal,
 (iii) first control means for communicating commands to the first central processor, and
 (iv) an AC power supply for supplying operating power to the support module;

(b) a portable display module, for use independently of the support module, including:
 (i) a second central processor,
 (ii) second control means for communicating commands to the second central processor,
 (iii) a smectic liquid crystal flat panel display, comprising said visual display unit, having a plurality of electrically actuated picture elements, which flat panel display is for displaying a whole page of data at a time as a result of actuation of the corresponding picture elements,
 (iv) a second memory connected to the second central processor for storing a number of said pages of data for presentation on said display,
 (v) display interface means connected to the display for controlling the actuation of said picture elements and thus the display of said data,
 (vi) a battery for supplying operating power to the display module; and (c) means for detachably connecting the display module to the support module to allow the first central processor to control the contents of the display when the display module is connected to the support module.

4. The data processing terminal of claim 3 in which the display module further includes a touch sensitive overlay disposed over the flat panel display and connected to the second display when the display module is not attached to the support module.

5. The data processing terminal of claim 3 in which the first control means includes a keyboard coupled to the first central processor.

6. The data processing terminal of claim 3 in which the support module include a telephone interface unit coupled to the first central processor.

7. The data processing terminal of claim 3 in which the support module includes an additional smectic liquid crystal flat panel display that is permanently attached thereto, which additional flat panel display comprises another said visual display unit and is for displaying a whole page of data at a time.

8. The data processing terminal of claim 7 in which the display module is pivotally attached to the support module.

9. The data processing terminal of claim 3 in which the display module further includes a touch sensitive overlay disposed over the flat panel display and connected to the second central processor for use in manipulating the contents of the display and for entering data when the display module is not attached to the support module.

10. The data processing terminal of claim 8 in which the support module defines a recess into which the display module will fit when the display module is pivoted into contact with the support module.

11. The data processing terminal of claim 8 in which the displays are adjacent to one another when the display module is pivoted into the desired operating position.

* * * * *